US006937991B1

(12) United States Patent
Zompa et al.

(10) Patent No.: US 6,937,991 B1
(45) Date of Patent: Aug. 30, 2005

(54) METHOD AND COMMUNICATION SYSTEM FOR ENHANCING INTERNATIONAL TRAVEL PREPAREDNESS WITHIN AN ORGANIZATION (75) Inventors: Joseph M. Zompa, Brookfield, WI (US); Susan L. Batten, Pewaukee, WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 373 days.

(21) Appl. No.: 09/471,674

(22) Filed: Dec. 24, 1999

(51) Int. Cl.[7] .............................................. G06F 17/60
(52) U.S. Cl. .............................................. 705/5; 705/6
(58) Field of Search ........................................ 705/5, 6

(56) References Cited

U.S. PATENT DOCUMENTS

| | | | | |
|---|---|---|---|---|
| 5,237,499 A | * | 8/1993 | Garback ......................... | 705/5 |
| 5,570,283 A | * | 10/1996 | Shoolery et al. ................ | 705/5 |
| 5,832,451 A | * | 11/1998 | Flake et al. ..................... | 705/5 |
| 5,832,453 A | * | 11/1998 | O'Brien .......................... | 705/6 |
| 6,018,715 A | * | 1/2000 | Lynch et al. .................... | 705/5 |
| 6,125,356 A | * | 9/2000 | Brockman et al. ............. | 705/37 |
| 6,266,648 B1 | * | 7/2001 | Baker, III ...................... | 705/14 |
| 6,269,369 B1 | * | 7/2001 | Robertson ..................... | 707/10 |
| 6,324,517 B1 | * | 11/2001 | Bingham et al. ............... | 705/8 |
| 6,442,526 B1 | * | 8/2002 | Vance et al. .................... | 705/5 |

FOREIGN PATENT DOCUMENTS

JP          60168265 A  *  8/1985  ........... G06F/15/26

OTHER PUBLICATIONS

Jurgens, Kallie, "Doctor Urges Agents to Join Preventative Program Against Molaria," May 19, 1983, Travel Weekly, vol. 42, p. 9.*

"The SABRE Group Supasses 180 Customers for Business Travel Suite," Jul. 27, 1998, PR Newswire, 1 page. (2 pages as printed.)*

Delvin, David, "Protecting Your Health Abroad," Dec. 1978, International Travel Management, vol. 33 No. 12, p. 56.*

* cited by examiner

Primary Examiner—Joseph Thomas
Assistant Examiner—R. L. Porter
(74) Attorney, Agent, or Firm—Peter Yogel, Esq.

(57) ABSTRACT

In an organization having a large number of employees, and also having a travel center, a method is provided for enhancing preparedness of employees for international travel. When the travel center is requested to make international travel arrangements for an employee, a travel notification message identifying the employee is transmitted to each of a number of specialized, travel service providers associated with the organization. A computer associated with a given travel service provider is then operated to determine whether the employee was identified in a previously received travel notification message. If not, the given travel service provider transmits a first travel preparation message to the employee, which comprises a complete list of travel services available from the given travel service provider. Otherwise, the given travel service provider transmits a second travel preparation message to the employee, which comprises a list of updating travel services available from the given travel service provider.

11 Claims, 5 Drawing Sheets

METHOD AND COMMUNICATION SYSTEM FOR ENHANCING INTERNATIONAL TRAVEL PREPAREDNESS WITHIN AN ORGANIZATION

BACKGROUND OF THE INVENTION

The invention disclosed and claimed herein generally pertains to a system for more effectively communicating information, which relates to international travel, to members of a business or other organization who are planning to engage in such travel. More particularly, the invention pertains to a system of the above type which may readily employ interconnected computers and electronic data transmission links. Even more particularly, the invention pertains to a system of the above type which identifies persons in a large organization intending to travel from one country to another, and which timely provides such persons with important travel information generated by different functions or departments of the organization.

In many large American corporations, as well as in other types of organizations, there is an increasing need for employees to travel across national boundaries, from one country to another. Accordingly, it has become common for such organizations to maintain travel centers or the like, which assist employees in making international travel arrangements. The travel center may be an in-house function or department of a business organization, or it may be an outside travel agency or the like, which is under contract to provide travel services to organization employees. The term "travel center", as used herein, includes all such arrangements. More specifically, such term is intended to include any entity, regardless of its relationship to an organization, which is tasked to make international travel arrangements for organization employees or members. Typically, travel arrangements made by such travel centers have, in the past, been limited to making hotel and transportation reservations, delivering tickets therefor, and sometimes providing information in regard to passports and other documents needed to enter a foreign country.

In recent years, business organizations have recognized that certain of their activities, operations and functions, because of particular expertise and resources possessed thereby, can provide specialized information and services to international travelers. Such specialized information and services are generally beyond the scope and capabilities of conventional travel centers, as defined above. For example, it is very common for a business organization to maintain a medical office or clinic, which is primarily concerned with the health care needs of employees located in the immediate area or vicinity. However, some businesses have now recognized that their medical operations can also provide vital services for prospective international travelers. Such services have been found to include medical travel advice, immunization recommendations for the countries to which travel is intended, and providing guidance for dealing with medical emergencies in such countries. In certain businesses, the medical operation is equipped to provide required immunizations, and also to supply international travelers with medical kits containing very useful items such as basic medications, bandages and sterile inoculation needles. For many companies, employee travel is now directed to nearly all habited regions of the world, and extends to locations which, until very recently, were little known and considered remote by American and European travelers. Accordingly, health care concerns of international business travelers are of increasing interest and importance.

In a number of organizations, an information technologies (IT) or information systems (IS) operation, which is generally concerned with computers, computer networks and interconnections thereof, provides a further example of a specialized in-house activity which can also provide important services for international business travelers. For example, such travelers increasingly are equipped with laptop computers. These computers may be essential for enabling a traveler to function at a foreign location, and also for enabling the traveler to access the internet and to send and receive e-mails. However, if a laptop computer has an electric cord with a plug suitable for receptacles in the United States, it will not be usable with the receptacles found in most European countries. Similar incompatibilities occur in regard to the plug used to connect a computer modem to a telephone line. Accordingly, the IT operations of some business organizations now perform the task of equipping travelers with adapters and other components to make their computer equipment useable at foreign sites. Such IT operations may provide other valuable services and information as well, such as instructions on accessing a corporation internet website, in order to obtain maps and other useful travel information.

While certain specialized functions of a business, as described above, can provide useful services in preparing an employee for international travel, such services frequently are not utilized or taken advantage of. Usually, this occurs because the employee is largely or entirely unaware of international travel services which can be provided by the specialized functions. In the past, the travel center of an organization typically has had little or no contact with such specialized functions, and accordingly, has likewise tended to be unaware of their capabilities in regard to international travel. Moreover, even when the travel services of a specialized function are used, the function may not be able to get feedback from an employee after he or she returns from travel, in order to determine whether the services were beneficial, and how they may be improved.

SUMMARY OF THE INVENTION

In an organization having a large number of employees or other members, and also having a travel center, the travel center will typically be used to make all arrangements for international travel of employees, when requested to do so. In order to enhance preparedness of organization employees for international travel, each of the specialized functions of the organization, referred to above, should be notified immediately of all international travel plans. Thus, the first step of the inventive method disclosed herein comprises transmitting a Travel Notification Message, from the travel center to each of the specialized functions, when the travel center is requested to make international travel arrangements for a given organization employee or member. The term "Travel Notification Message", as used herein, refers to a communication which identifies a prospective traveler by name, and sets forth his or her foreign destination and dates of travel. Also, all the specialized functions of the organization, which are tasked to provide various services in regard to international travel, are collectively referred to hereinafter, for convenience, as "specialized travel service providers".

It has been recognized that some employees planning international travel will have previously received travel services from a particular travel service provider, and that other employees, such as first time travelers, will not have previously received such services. Thus, to minimize redundancies, a specialized travel service provider, after receiving a new Travel Notification Message, determines whether it previously rendered international travel assistance to the employee named therein. Such determination is preferably carried out by furnishing each travel service provider with a computer, each of the computers having a database for storing previously received Travel Notification Messages. Each of the computers is configured to determine whether or not the employee named in the new Travel Notification Message was identified in any previously received Travel Notification Messages. If not, the specialized travel service provider transmits a first Travel Preparation Message to the employee, which comprises a complete list of travel services available from the travel service provider. On the other hand, if it is determined that the travel service provider has previously assisted the employee, it transmits a second Travel Preparation Message thereto, which is limited to a list of updating travel services. Examples of the contents of both first and second Travel Preparation Messages are set forth hereinafter, in the Detailed Description of the Preferred Embodiment.

In a preferred embodiment of the invention, a Travel Notification Messages is transmitted by means of a first data transmission link extending from the travel center to each of the specialized travel service providers. Preferably, the first data transmission link comprises a computer accessible to the travel center and a path for transmitting electronic messages from the travel center computer to respective computers of the specialized travel service providers. A second data transmission link, extending from each of the travel service provider computers, transmits Travel Preparation Messages to respective employees. Preferably also, the computer of at least one of the specialized travel service providers is configured to send traveling employees post travel questionnaires or surveys, after they return. Usefully, one of the specialized travel service providers comprises a medical or healthcare operation of the organization, and another of the specialized travel service providers comprises an IT opertion, or is otherwise able to provide services pertaining to the use of computers and other electronic devices. However, the scope of the invention is not limited thereto.

DETAILED DESCRIPTION OF THE PREFERRED EMBODIMENT

Figure 1:
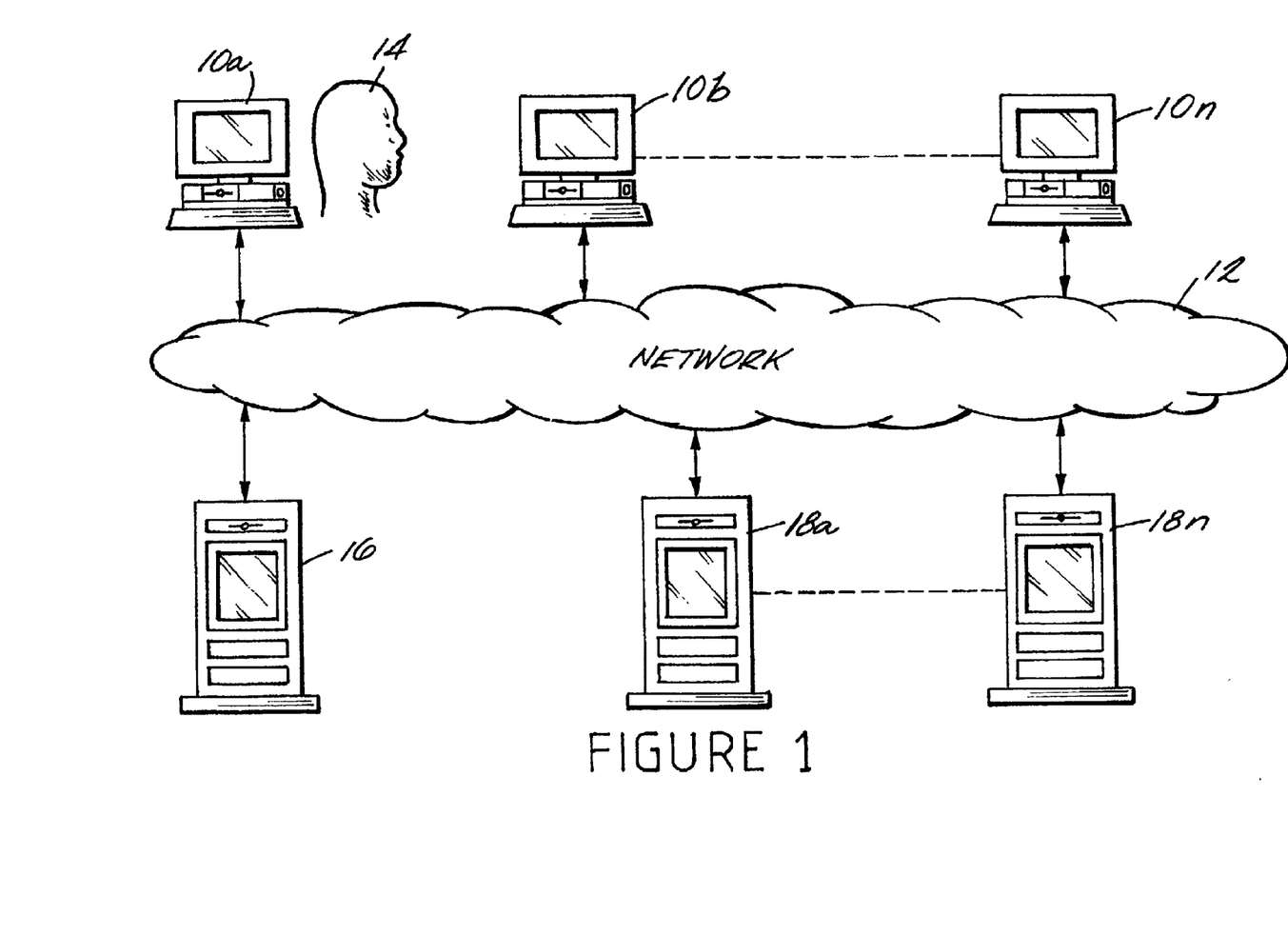
FIG. 1 shows an overall environment in which an embodiment of the invention may be used.

Referring to FIG. 1, there is shown an overall environment in which an embodiment of the invention usefully may be practiced. More particularly, there is shown a number of computers, such as personal computers 10a, 10b and 10n, each of which is interconnected to a network or data transmission channel 12. It is to be understood that the computers 10a, 10b and 10n are representative of a very large number of computers, all of which are associated with a business corporation or other organization of very large size, and all connected together through network 12. Each of the computers 10a–10n is located at the workstation of an employee or other member of the organization, such as employee 14 shown with computer 10a, or is otherwise accessible to such employee.

Referring further to FIG. 1, there are shown computers 16 and 18a–18n, each connected to network 12 in like manner with computers 10a–10n. Thus, the computers 16 and 18a–18n are interconnected with one another, and also with each of the computers 10a–10n. Computer 16 is accessible to and used by a travel center associated with the business organization, the travel center being responsible for making travel arrangements for employees such as employee 14. As stated above, the travel center may be either an in-house function or an outside agency. The computers 18a–18n are respectively associated with and used by different specialized operations or functions of the organization. Each of the specialized functions, because of its particular expertise, is able to provide important services and information to employees of the organization who must travel from one country to another, in the course of their duties. For example, computer 18a could be used by a medical operation of the business organization, or alternatively could be used by the IT operation thereof. It is to be emphasized that the scope of the invention extends to other specialized functions of the organization as well, which are respectively capable of providing various travel services and information to prospective international travelers of the organization. As stated above, all such specialized functions are collectively referred to herein as specialized travel service providers.

In one arrangement, each of the computers 10a–10n, 16 and 18a–18n would be located in a common building or facility. In such arrangement, network 12 could comprise a local area network (LAN) or the like. In another arrangement, different computers would be located in different buildings, possibly in different states from one another or even in different countries. In this arrangement, network 12 could usefully comprise the internet, or other available national or global interconnection system. Thus, it is anticipated that e-mail messages and other electronic data may be readily transmitted between any of the computers 10a–10n, 16 and 18a–18n, 15 regardless of how remote they may be from one another. It is further anticipated that any employee of the organization who is accessible to one of the computers 10a–10n, and who is required to engage in international travel for the organization, will contact the travel center, in order to have the travel center make his or her travel arrangements.

Figure 2:
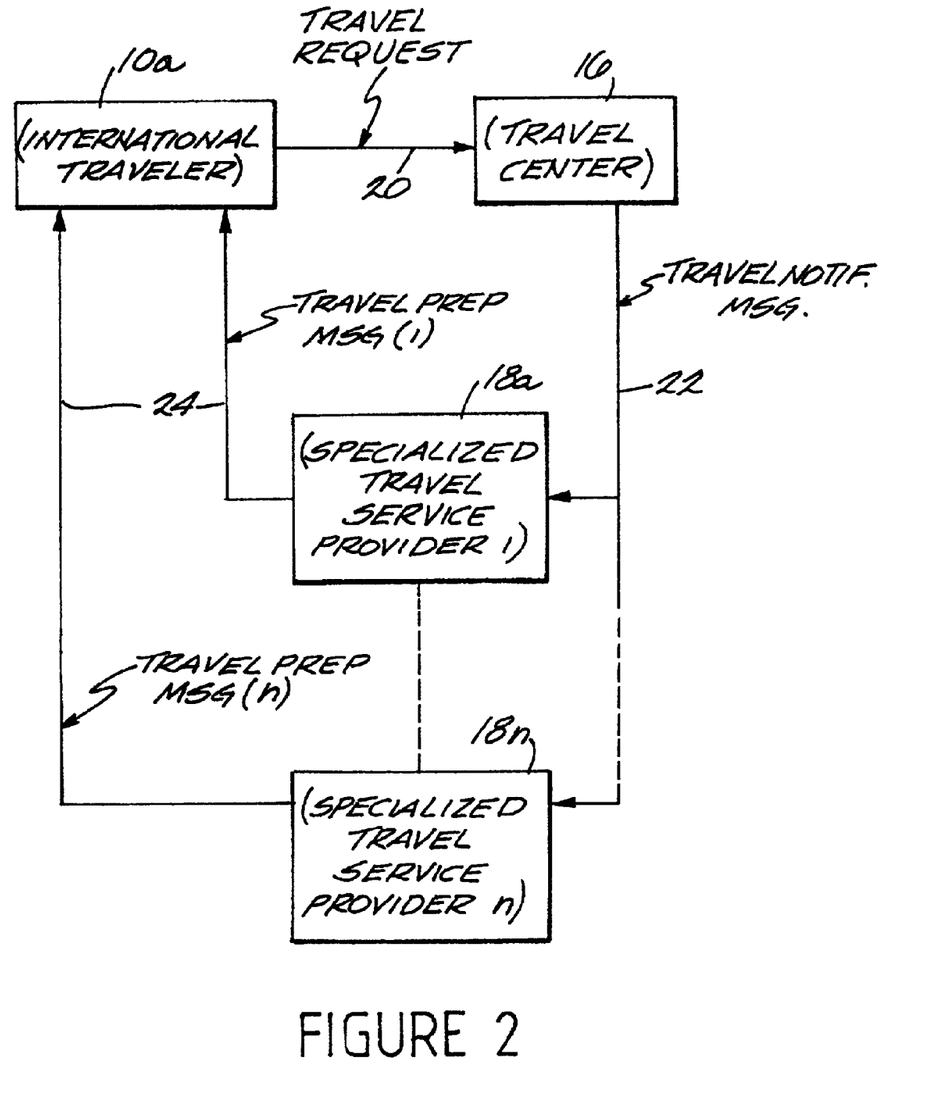
FIG. 2 is a block diagram showing an embodiment of the invention.

Referring to FIG. 2, there is shown travel center computer 16 receiving a request to make travel arrangements, such as from an employee 14. The request usefully is in the form of an e-mail, sent by means of computer 10a and a data transmission link 20, comprising a portion of the network 12. Alternatively, the travel request could be made by means of a phone message or the like. Upon receiving a travel request, the travel center sends a Travel Notification Message to the specialized travel service providers respectively associated with computers 18a–18n. As stated above, the Travel Notification Message identifies the individual planning travel, the dates or time period of the travel, and the intended destination or destinations. Usefully, the Travel Notification Message is transmitted in the form of an e-mail message or the like, from travel center computer 16 to each of the computers 18a–18n, by means of a data transmission link 22 comprising a portion of the network 12. This procedure ensures that all specialized travel service providers will quickly be made aware of all international travel plans of organization employees. As stated above, and in accordance with the invention, it has been recognized that all employees of the organization planning travel to foreign countries will use the travel center to make their travel arrangements.

It is anticipated that each of the travel service provider computers 18a–18n would be equipped with a database or the like for storing the information contained in previously received Travel Notification Messages. Thus, upon receiving a new Travel Notification Message, a travel service provider can readily determine whether or not the person identified therein previously received travel-related services from the provider. As described hereinafter in further detail, such determination is usefully accomplished by operating a travel service provider's computer to determine whether the name of the person identified in the new Travel Notification Message is found in the database of previously received Travel Notification Messages.

By providing such determination capability, a specialized travel service provider is enabled to adjust the services which it offers to a prospective international traveler. For example, if it is determined that a prospective traveler has never previously received assistance from the travel service provider, the provider will send a Travel Preparation Message to the traveler which comprises a comprehensive list of all travel-related information and services available from the provider. The list could also include recommendations for actions to be taken by the traveler prior to his or her departure. On the other hand, if it is determined that the prospective traveler has previously received assistance from the travel service provider, the provider may send a Travel Preparation Message which is limited to updating previously sent travel information, and to providing services supplementary to previously rendered services. Thus, redundancies and unnecessary actions in providing travel services are minimized, while at the same time optimizing preparedness for international travel.

It will be appreciated that Travel Preparation Messages can usefully be transmitted to prospective travelers in the form of e-mails, sent from one of the computers 18a–18n to a computer 10a or the like by means of a data link 24, comprising a portion of network 12. As an additional feature, after a traveler has returned from his or her travels, a specialized travel service provider may transmit a questionnaire or survey thereto by means of a data transmission link 24. The travel service provider thereby can obtain feedback, to determine the effectiveness of its travel services and receive guidance for improving such services.

In one very useful embodiment of the invention, computers 16 and 18a–18n are respectively configured so that, upon receipt of a travel request, both the Travel Notification and Travel Preparation Messages are automatically generated and transmitted, as described above. Thus, no human or operator involvement is required. In other embodiments, varying levels of human interaction will be involved, in transmitting a Travel Notification Message from the travel center to the computers 18a–18n, and in communicating travel-related information from respective specialized travel service providers to the prospective traveler.

Figure 3:
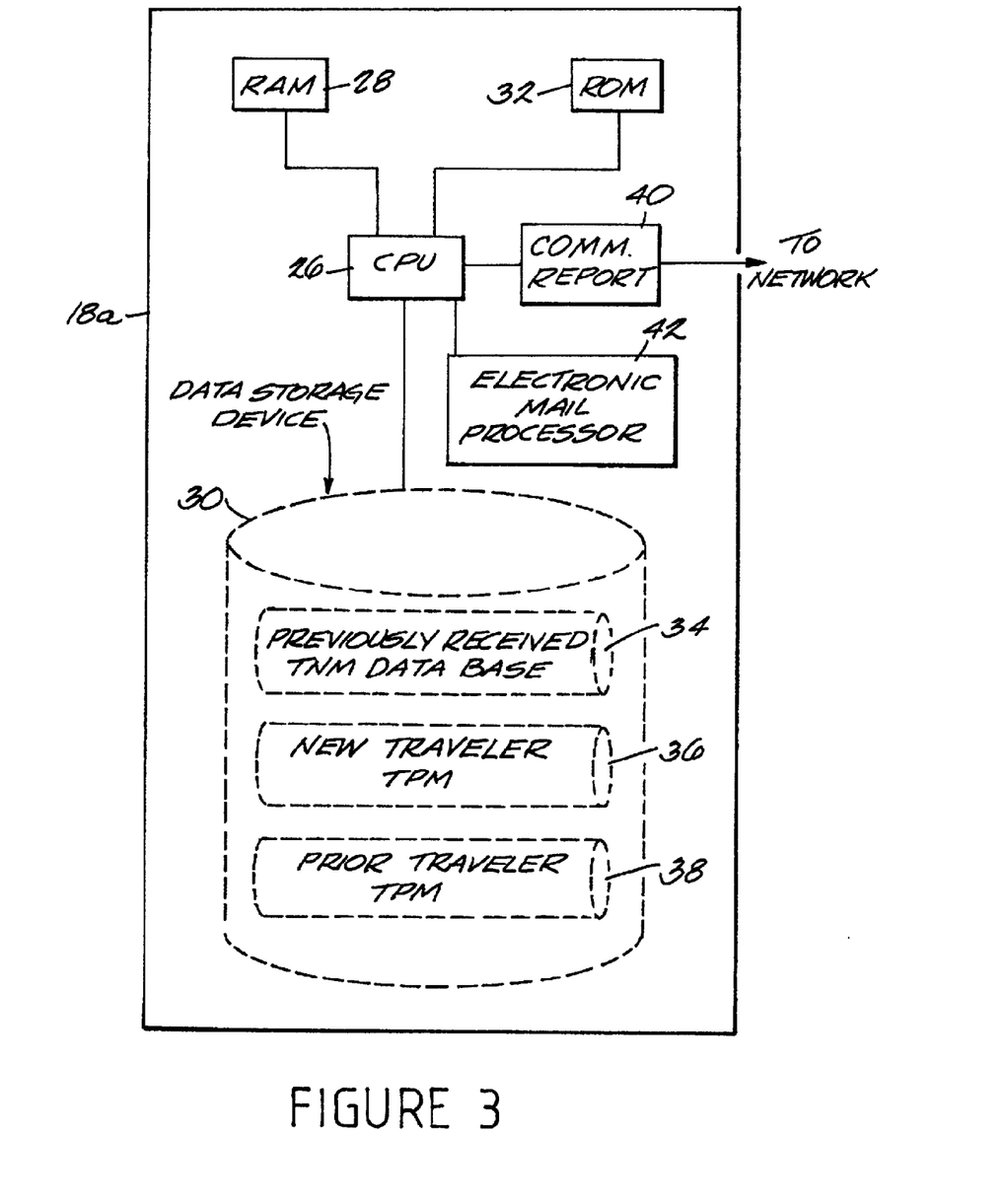
FIG. 3 is a simplified schematic diagram showing a computer of the type used by a specialized travel service provider in the embodiment of FIG. 2.

Referring to FIG. 3, there is shown a simplified block diagram of an exemplary computer 18a, used by one of the specialized travel service providers. Such computer performs respective operations of a conventional general computer, and performs other additional operations in accordance with the invention. Computer 18a includes a central processing unit (CPU) 26, and a random access memory (RAM) 28 and read only memory (ROM) 32 associated therewith. The CPU 26 is coupled to a data storage device 30, comprising one of a number of conventional devices, which includes a database 34 comprising previously received Travel Notification Message information. Storage device 30 further provides a storage component 36 for a Travel Preparation Message directed to new travelers, and a storage component 38 for a Travel Preparation Message directed to prior or experienced travelers. FIG. 3 shows computer 18a provided with a communications port 40, for coupling CPU 26 and computer 18a to network 12, and also provided with an electronic mail processor 42, for generating, processing, and receiving e-mail messages.

Figure 4:
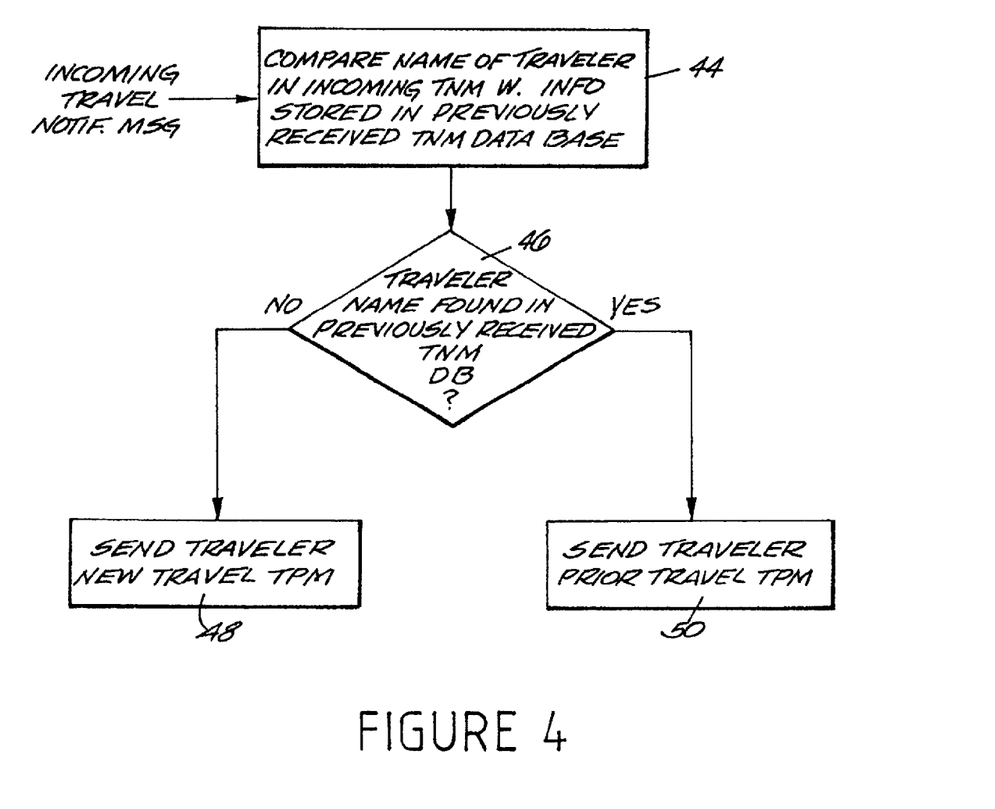
FIG. 4 is a flowchart illustrating operation of the computer of FIG. 3 in implementing an embodiment of the invention.

Referring to FIG. 4, there is shown a flowchart setting forth the operation of computer 18a in accordance with an embodiment of the invention. Upon receiving a new or incoming Travel Notification Message, the name of the prospective traveler identified thereby is compared with the names found in previously received Travel Notification Messages stored in database 30, at process block 44. In accordance with decision block 46, it is then determined whether the traveler named in the incoming travel notification message has or has not previously received services from the travel service provider using computer 18a, according to whether the traveler's name was or was not found in a previously received Travel Notification Message. If not, a new Travel Preparation Message, as described above, will be sent to the prospective traveler in accordance with process block 48. Otherwise, a prior traveler Travel Preparation Message, as likewise described, is sent to the traveler in accordance with process block 50.

If the computer 18a is associated with the medical operation or department of an organization, contents of the Travel Preparation Message sent to new travelers could include, for example, information regarding immunizations required for travel abroad, and in particular for the traveler's intended destination. Such Travel Preparation Message could also inform the new traveler of medical department procedures for making an appointment to receive immunizations prior to departure, and to receive itinerary specific medical counseling and a medical travel kit. As stated above, the medical kit may usefully contain items such as bandages, sterile needles, medications including antibiotics, and basic healthcare information for foreign travel. The Travel Preparation Message for the new traveler could additionally provide information for dealing with medical emergencies at the intended destination, including phone numbers of local healthcare facilities.

For a traveler who has previously received services from the medical operation, the Travel Preparation Message sent thereto, in accordance with process block 50 of FIG. 4, could be truncated or more limited than the Travel Preparation Message sent to a new traveler. For example, the Travel Preparation Message sent to the prior traveler could simply update immunization recommendations, since the time of last international travel. With regard to the travel kit, the updating Travel Preparation Message could indicate that the prior traveler need only replenish antibiotics or other perishable items thereof.

If the computer 18a is associated with an information technology operation of a business organization, contents of the Travel Preparation Message sent to new travelers could include, for example, instructions on obtaining electrical outlet and modem adapters for the traveler's laptop computer or other equipment. The Travel Preparation Message for the new traveler could also include instructions on accessing a website maintained by the organization, in order to obtain useful international travel information. On the other hand, the Travel Preparation Message for a prior traveler could be limited to updating website accessing instructions, to indicate any changes thereof since the time of last international travel of the prior traveler.

Figure 5:
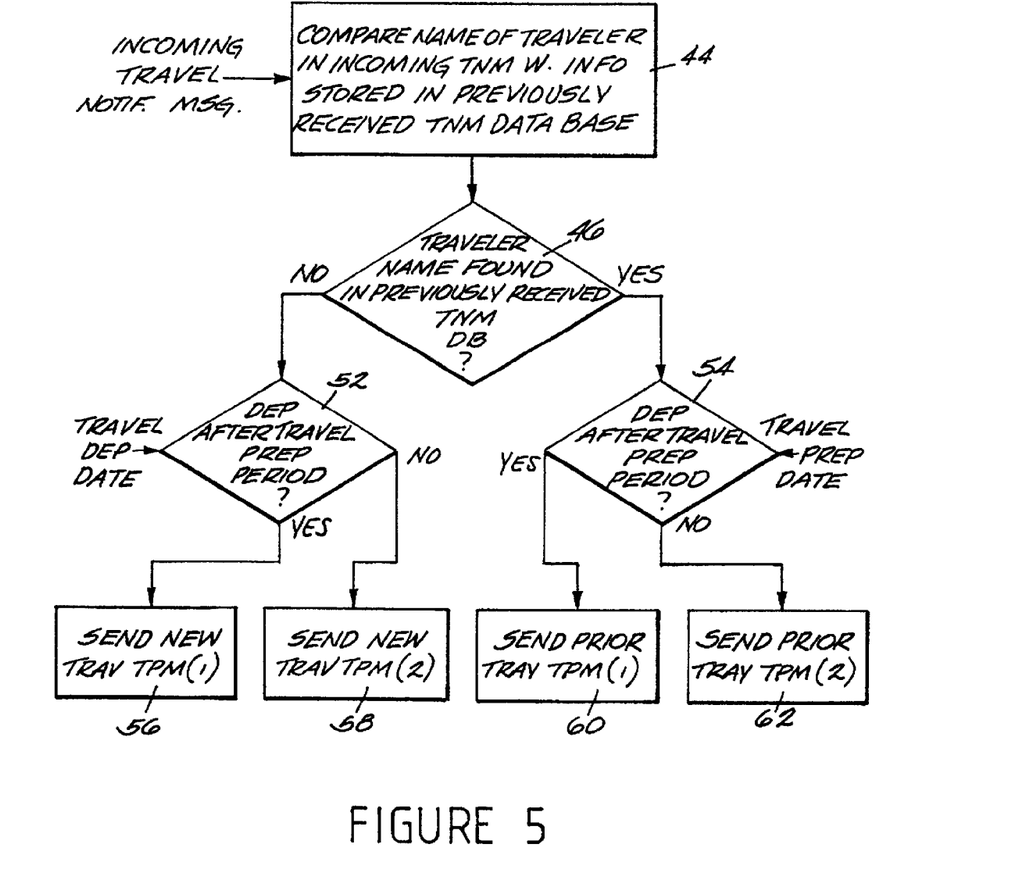
FIG. 5 is a flowchart for a modification of the embodiment of FIG. 4.

It is anticipated that an embodiment of the invention will promptly inform every specialized service provider of upcoming international travel plans for any employee or other member of the organization. Even so, some travel plans will not be made until just before the intended time of departure. To accommodate these situations, the embodiment described in connection with FIG. 4 is usefully modified as shown in FIG. 5. FIG. 5 includes process block 44 and decision block 46 as previously described. However, FIG. 5 further includes decision blocks 52 and 54, coupled to respective ouputs of decision block 46. Each of the decision blocks 52 and 54 receives the travel departure date from the incoming Travel Notification Message, and is also provided with a prespecified travel preparation period. Such period is the length of time deemed necessary, by the specialized travel service provider, for a prospective traveler to take full advantage of its services. Such period, for example, could be three days.

If it is determined at decision block 52 that a new traveler will not depart until after the travel preparation period, a first Travel Preparation Message is sent to the new traveler, in accordance with process block 56. Such message may be the same message as is sent to new travelers, as described above in connection with FIG. 4. For example, if the specialized service provider is an IT operation, the first Travel Preparation Message could include an instruction to pick up a computer modem adapter from a local IT operation facility, prior to departure.

On the other hand, if it is determined at decision block 52 that a new traveler will depart before the end of the travel preparation period, a second truncated Travel Preparation Message is sent to the traveler, as indicated by process block 58. The second message would not include services which could not be provided within the reduced time before departure. However, it might provide compensatory measures which the traveler could take, after arriving at his or her foreign destination. In connection with the above example of the modem adapter, the second message could instruct the traveler how to order the adapter from a supplier, for delivery to a foreign destination, by overnight express.

In a similar manner, a prior international traveler may also receive either a first or a second Travel Preparation Message, in accordance with the process blocks 60 and 62, respectively, which are shown by FIG. 5 to receive respective outputs of decision block 54

Obviously, many other modifications and variations of the present invention are possible in light of the above teachings. It is therefore to be understood that within the scope of the disclosed concept, the invention may be practiced otherwise than as has been specifically described.

What is claimed is:

1. In an organization having a large number of members, and also having a travel center disposed to make travel arrangements for respective organization members when requested to do so, a method for enhancing preparedness of organization members for international travel comprising the steps of:

transmitting a travel notification message from said travel center to each of a selected number of travel service providers associated with said organization, transmitting said travel notification message during a given member interaction when said travel center is requested to make international travel arrangements for a given one of said organization members, said travel notification message identifying: said given member, an intended travel time period for said given member, and an intended travel destination for said given member;

operating at least one computer respectively associated with said selected number of travel service providers to determine whether said given member was identified in a previously received travel notification message;

transmitting a first travel preparation message to said given member from a given travel service provider, transmitting said first travel preparation message during said given member interaction and when the computer of said given travel service provider determines that said given member has not been identified in said previously received travel notification message, said first travel preparation message comprising a complete list of travel services available from said given travel service provider; and transmitting a second travel preparation message to said given member from said given travel service provider, transmitting said second travel preparation message during said given member interaction and when the computer of said given travel service provider determines that said given member has been identified in said previously received travel notification message, said second travel preparation message comprising a list of updating travel services available from said given travel service provider.

2. The method of claim 1 wherein:

said travel notification message and said travel preparation messages are transmitted by first and second data transmission links, respectively.

3. In an organization having a large number of members, and also having a travel center disposed to make travel arrangements for respective organization members when requested to do so, a communication system for enhancing preparedness of organization members for international travel, said system comprising:

a first data transmission link extending from said travel center to each of a selected number of travel service providers associated with said organization, said first data link operable to transmit a travel notification message to each of said travel service providers during a given member interaction when said travel center is requested to make international travel arrangements for a given one of said organization members, said travel notification message identifying: said given member, an intended travel time period for said given member, and an intended travel destination for said given member;

a computer associated with each of said travel service providers, each of said computers having a database for storing previously received travel notice messages, and each of said computers configured to determine whether said given member was identified in any previously received travel notification message;

a second data transmission link extending from each of said computers to a message receiving device accessible to said given member, the second data link of a given computer being disposed to transmit a first travel preparation message to said message receiving device during said given member interaction in response to a determination by said given computer that said given member was not identified in any travel notification message received thereby, said first travel preparation message comprising a complete list of travel services available from the travel service provider associated with said given computer; and said second data link of said given computer being disposed further to transmit a second travel preparation message to said message receiving device during said given member interaction in response to a determination by said given computer that said given member was identified in a travel notification message previously received thereby, said second travel preparation message comprising a list of updating travel services available from said travel service provider associated with said given computer.

4. The communication system of claim 3 wherein said first data transmission link comprises:

a computer accessible to said travel center; and a path for transmitting electronic messages which extends from said travel center computer to respective computers of said travel service providers.

5. The communication system of claim 4 wherein:

said message receiving device comprises a computer terminal accessible to said given member; and said second data transmission link comprises a path for transmitting electronic messages which extends from each of said computers of said travel service providers to said computer terminal of said given member.

6. In an organization having a travel center disposed to make travel arrangements for a given organization member in response to a travel request, and also having a number of travel service providers, a communication system for enhancing preparedness of said given member for international travel comprising:

a first transmission means for transmitting a travel notification message from said travel center to each of said travel service providers, said first transmission means responsive to one of said travel requests during a given member interaction, said travel notification message identifying: said given member, an intended travel time period for said given member, and an intended travel destination for said given member;

a computer associated with each of said travel service providers, each of said computers having a database for storing previously received travel notification messages; and a second transmission means for transmitting a travel preparation message to said given member during said given member interaction, said travel preparation message being generated by the computer associated with a given one of said travel service providers, said travel preparation message comprising a list of travel services available to said given member from said given travel service provider.

7. The communication system of claim 6 wherein:

said first transmission means comprises a first data transmission link extending from said travel center to each of said travel service providers;

said second transmission means comprises a second data transmission link extending from each of said computers to a message receiving device accessible to said given member.

8. The communication system of claim 7 wherein:

each of said computers is configured to determine whether said given member was identified in any previously received travel notification message.

9. The communication system of claim 8 wherein:

the second data transmission link of a given one of said computers is disposed to transmit a first travel preparation message to said message receiving device in response to a determination by said given computer that said given member was not identified in any travel notification previously received thereby, said first travel preparation message comprising a complete list of travel services available from the travel service provider associated with said given member; and said second data link of said of said given computer is disposed further to transmit a second travel preparation message to said message receiving device in response to a determination by said given computer that said given member was identified in a travel notification message previously received thereby, said second travel preparation message comprising a list of updating travel services available from said travel service provider associated with said given member.

10. The communication system of claim 7 wherein said first data transmission link comprises:

a computer accessible to said travel center; and a path for transmitting electronic messages which extends from said travel center computer to respective computers of said travel service providers.

11. The communication system of claim 10 wherein:

said message receiving device comprises a computer terminal accessible to said given member; and said second data transmission link comprises a path for transmitting electronic messages which extends from each of said computers of said travel service providers to said computer terminal of said computer terminal.

* * * * *